United States Patent
Jung et al.

(10) Patent No.: US 9,994,707 B2
(45) Date of Patent: Jun. 12, 2018

(54) COMPOSITE BASED ON POLYALKYLENE CARBONATE AND POLYOLEFIN

(71) Applicants: NARA Chem Co., Ltd., Seongnam-si, Gyeonggi-do (KR); Dong Kweon Lee, Anyang-si, Gyeonggi-do (KR)

(72) Inventors: Keun Bong Jung, Cheonan-si (KR); Dong Kweon Lee, Anyang-si (KR); Sang Moon Lee, Seoul (KR); Dong Jin Lee, Daejeon (KR)

(73) Assignees: HUINNOVATION CO., LTD., Seongnam-si (KR); Dong Kweon Lee, Anyang-si (KR)

( * ) Notice: Subject to any disclaimer, the term of this patent is extended or adjusted under 35 U.S.C. 154(b) by 0 days. days.

(21) Appl. No.: 14/377,207

(22) PCT Filed: Mar. 13, 2013

(86) PCT No.: PCT/KR2013/002015
§ 371 (c)(1),
(2) Date: Aug. 7, 2014

(87) PCT Pub. No.: WO2013/157739
PCT Pub. Date: Oct. 24, 2013

(65) Prior Publication Data
US 2015/0005419 A1    Jan. 1, 2015

(30) Foreign Application Priority Data
Apr. 19, 2012 (KR) .................. 10-2012-0041178

(51) Int. Cl.
| | |
|---|---|
| *C08L 69/00* | (2006.01) |
| *B32B 7/12* | (2006.01) |
| *B32B 27/08* | (2006.01) |
| *C08L 23/02* | (2006.01) |
| *C09J 169/00* | (2006.01) |
| *B32B 27/30* | (2006.01) |
| *B32B 27/32* | (2006.01) |
| *B32B 27/34* | (2006.01) |

(52) U.S. Cl.
CPC .............. *C08L 69/00* (2013.01); *B32B 7/12* (2013.01); *B32B 27/08* (2013.01); *B32B 27/306* (2013.01); *B32B 27/32* (2013.01); *B32B 27/34* (2013.01); *C08L 23/02* (2013.01); *C09J 169/00* (2013.01); *B32B 2270/00* (2013.01); *B32B 2323/00* (2013.01); *B32B 2369/00* (2013.01); *B32B 2605/08* (2013.01); *Y10T 428/2848* (2015.01); *Y10T 428/2878* (2015.01); *Y10T 428/31507* (2015.04)

(58) Field of Classification Search
CPC ......... C08L 69/00; B32B 27/306; B32B 7/12; B32B 27/08
USPC ........................................ 524/112
See application file for complete search history.

(56) References Cited

U.S. PATENT DOCUMENTS

| | | | | |
|---|---|---|---|---|
| 4,303,759 A * | 12/1981 | Dixon | ............... | C08K 5/005 524/167 |
| 6,544,661 B1 | 4/2003 | Lee | | |
| 2005/0137356 A1* | 6/2005 | Hale | ................. | C08L 67/02 525/421 |
| 2011/0309539 A1 | 12/2011 | Steinke et al. | | |

FOREIGN PATENT DOCUMENTS

| | | |
|---|---|---|
| KR | 95-008901 B1 | 8/1995 |
| KR | 10-0266853 B1 | 9/2000 |
| KR | 10-1073888 B1 | 10/2011 |
| KR | 10-2011-0127727 A | 11/2011 |

OTHER PUBLICATIONS

International Search Report issued in PCT/KR2013/002015, dated Jun. 26, 2013.
Written Opinion issued in PCT/KR2013/002015, dated Jun. 26, 2013.

* cited by examiner

*Primary Examiner* — Deve E Valdez
(74) *Attorney, Agent, or Firm* — Birch, Stewart, Kolasch & Birch, LLP

(57) ABSTRACT

Disclosed is a polyalkylene carbonate and polyolefin-based composite and, more particularly, a composite prepared through reaction of a mixed composition including polyalkylene carbonate, polyolefin, an initiator, and a blending aid, wherein an amount of the polyalkylene carbonate is 60 wt % to 95 wt %, a total amount of the initiator, the blending aid, and the polyolefin is 5 wt % to 40 wt %, and the composite has a matrix-filler morphology in which a matrix formed of the polyalkylene carbonate includes a filler formed of the polyolefin.

14 Claims, 3 Drawing Sheets

COMPOSITE BASED ON POLYALKYLENE CARBONATE AND POLYOLEFIN

TECHNICAL FIELD

The present invention relates to a polyalkylene carbonate and polyolefin-based composite and, more particularly, to a composite that is prepared through reaction of a mixed composition including polyalkylene carbonate, polyolefin, an initiator, and a blending aid, wherein the amount of the polyalkylene carbonate is 60 wt % to 95 wt %, a total amount of the initiator, the blending aid, and the polyolefin is 5 wt % to 40 wt %, and the composite has a matrix-filler morphology in which a matrix formed of the polyalkylene carbonate includes a filler formed of the polyolefin.

BACKGROUND ART

Plastic resins are one of the most convenient materials and have been used widely in daily life since the 20$^{th}$ century. In addition, as mass production of plastic resins is realized due to development of the petrochemical industry, demand therefor is rapidly increasing and use of plastic resins is expanded from applications for daily life to applications for industry.

General-purpose resins were initially used mainly in daily necessities such as household goods, engineering plastics are mainly used in applications for industry or manufacturing industry and, furthermore, super engineering plastics are used in specific fields, beyond satisfying required properties of materials for general industries and its market is continuously expanding.

As the automobile industry is focusing on more light-weight automobiles, demand for plastics is increasing in more various fields, and demand for polymer materials needed due to development of new technologies such as IT, semiconductors, electric vehicles, and the like is already growing in a variety of fields and is expected to be increasing more broadly in near future.

Recently, to address environmental problems due to generally used existing plastics, use of polyalkylene carbonates, which are aliphatic alkylene carbonates based on carbon dioxide generated as a byproduct gas, has drawn much attention.

Among these aliphatic alkylene carbonates, polypropylene carbonate (PPC) is prepared by polymerizing propylene oxide and carbon dioxide using a special catalyst. Currently, in the U.S., Novomer and Eastman Kodak are co-developing PPC as a packaging material with excellent oxygen-blocking properties, Japan's Sumitomo Chemical Co., Ltd is trying to enhance physical properties of PPC through complexation with other plastics and, in particular, Tianquan and the like in China are commercially producing PPC thanks to active support from the Chinese government. However, productivity of PPC is limited due to deficiency in manufacturing technology, in particular catalyst technology. In South Korea, SK Innovation Co. Ltd has succeeded in production of carbon dioxide-based polymers by developing a catalyst technology capable of minimizing the amount of a cyclic carbonate and generating high molecular weight and, currently, a total of 16 institutions including enterprises, laboratories, universities, and the like are participating in "business for practical applications of green technology using byproduct gases" organized by Ulsan Technopark and are progressing development of eco-friendly products using carbon dioxide-based polymers and commercialization thereof.

However, polyalkylene carbonates having a glass transition temperature Tg of about 38 to 40° C. are easily brittle at Tg or less and are not suitable for use in molded products due to soft and sticky properties thereof at Tg or higher, which makes use thereof as a plastic material difficult. Thus, efforts to use polyalkylene carbonates as a raw material of plastic products by improving impact strength characteristics and adhesiveness through mixing a polyalkylene carbonate with other materials and molding the mixture have continued. In particular, soft and sticky properties of polyalkylene carbonates at Tg or higher cause a phenomenon in which polyalkylene carbonate pellets are easily agglomerated as time elapses and thus the polyalkylene carbonate pellets are not fed into a molding machine when performing molding and have serious defects in distribution of the pellets. Thus, such properties need to be improved.

For example, Japanese Patent Application Laid-open No. 2007-119609 discloses a resin composition with enhanced tensile strength, elastic modulus of elongation and pyrolysis temperature by mixing polypropylene carbonate with calcium carbonate.

In addition, Chinese Patent Application Publication No. 1793237 discloses technology for enhancing glass transition temperature and mechanical characteristics, in particular tensile strength and impact strength by using a resin composition prepared by mixing polypropylene carbonate with layered silicate clay.

However, these resin compositions do not exhibit desired mechanical properties and therefore efforts to address such problems of polyalkylene carbonates through blending with polyolefin such as polyethylene (PE), polypropylene (PP), or the like, which is the most generally used, inexpensive, and has excellent processability among plastics, have been made.

However, it is impossible to blend polyolefin with polyalkylene carbonate due to a big difference between solubility parameters thereof. That is, there is no miscibility between the two resins.

In this regard, technologies for mixing between materials, which are not blended due to their different properties, have been developed according to respective base materials. For example, U.S. patent application Ser. Nos. 4,206,967 and 3,953,655 disclose use of a polymer prepared by copolymerizing or grafting a material selected from the group consisting of carboxylic acid, an anhydride, ester monomers, and the like onto a main chain or side chain of polyolefin or the like to mix a polar polymer such as ethylene vinyl alcohol (EVOH), nylon, or the like and polyolefin.

However, unlike existing base materials mixed with polyolefin, such as EVOH, nylon, and the like, when the polymer prepared by copolymerizing or grafting a material selected from the group consisting of carboxylic acid, an anhydride, ester monomers, and the like onto a main chain or side chain of polyolefin or the like is used to mix polyalkylene carbonate and polyolefin, a mixture of the two resins is unstable and thus miscibility therebetween is significantly deteriorated and it is therefore difficult to apply existing technologies to polyalkylene carbonates.

Thus, there is an urgent need to develop a polyalkylene carbonate-based molded product with enhanced mechanical characteristics and adhesiveness by increasing miscibility between polyalkylene carbonate, which is an eco-friendly material, and polyolefin such as polyethylene, polypropylene, or the like, which is a generally used plastic.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a composite is manufactured through reaction of a mixed composition having a novel composition including particular amounts of polyalkylene carbonate, polyolefin, and other specific components, mechanical properties and stickiness of polyalkylene carbonate are enhanced, thus completing the present invention.

Technical Solution

In accordance with one aspect of the present invention, provided is a composite that is prepared through reaction of a mixed composition including polyalkylene carbonate, polyolefin, an initiator, and a blending aid, wherein the amount of the polyalkylene carbonate is 60 wt % to 95 wt %, a total amount of the initiator, the blending aid, and the polyolefin is 5 wt % to 40 wt %, and the composite has a matrix-filler morphology in which a matrix formed of the polyalkylene carbonate includes a filler formed of the polyolefin.

The polyalkylene carbonate has flame retardancy and non-toxicity when burned and has excellent gas and organic solvent-blocking properties, high printability, high transparency, and the like. On the other hand, as described above, polyalkylene carbonate having a glass transition temperature Tg of 38 to 40° C. is very brittle at Tg or less and is not suitable for use as a general-purpose material due to high stickiness at Tg or higher and thus requires use in combination with a resin that may complement this problem. Thus, polyolefin, which is one of the most widely used general-purpose resins, has excellent processability, and is cheaper than other resins, may be used as a complementary resin.

In one specific embodiment, the polyalkylene carbonate may be various kinds of materials, in particular polyethylene carbonate (PEC) and/or polypropylene carbonate (PPC). PEC is synthesized through the following reaction scheme and, in particular, has a number average molecular weight of 25,000 to 500,000.

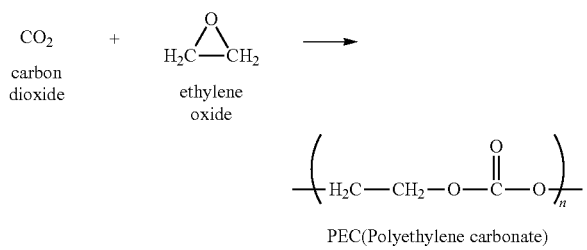

PEC(Polyethylene carbonate)

PPC is synthesized through the following reaction scheme and, in particular, has a number average molecular weight of 30,000 to 600,000.

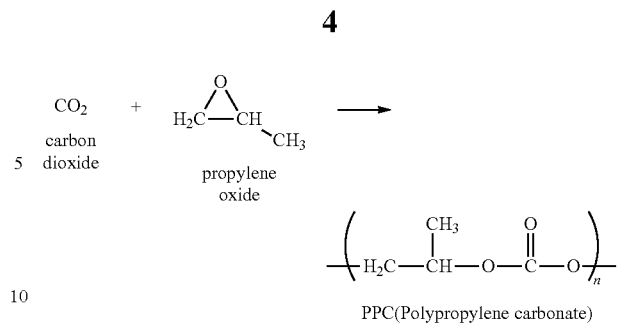

PPC(Polypropylene carbonate)

A method of preparing such polyalkylene carbonate is known in the art and thus a detailed description thereof will be omitted herein.

The polyolefin may, for example, be at least one polymer or copolymer selected from the group consisting of polyethylene (PE), polypropylene (PP), polybutene, ethylene-propylene rubber (EPR), ethylene-propylene diene rubber (EPDM), poly-4-methyl-1-pentene (TPX), copolymers of ethylene with propylene, butene, hexene and/or octene, and olefin-based thermoplastic elastomers.

The inventors of the present invention confirmed that a specific morphology may be formed and maintained by adjusting a composition of polyalkylene carbonate, polyolefin, and other particular components and also further applying processing conditions as desired and, accordingly, mechanical characteristics of the molded product may be enhanced.

In the molded product having a matrix-filler morphology, the filler formed of the polyolefin acts as a reinforcing agent for polyalkylene carbonate having brittleness and may be uniformly dispersed in the matrix formed of the polyalkylene carbonate. In this case, transparency of the composite may be kept and the uniformly dispersed polyolefin absorbs and/or disperses fracture energy applied from the outside and mechanical characteristics of the composite may be enhanced.

In one specific embodiment, the filler formed of the polyolefin may be present in the form of particles in the matrix formed of the polyalkylene carbonate. In this regard, the filler may have an average particle diameter of, in particular, 0.1 μm to 5 μm, more particularly 0.3 μm to 3 μm.

When the filler is present in the form of particles, externally applied fracture energy may be absorbed and/or uniformly dispersed in all directions. In addition, when the filler has the average particle diameter within the above-described ranges, the filler may satisfy both excellent mechanical characteristics and high transparency.

In particular, when the average particle diameter of the filler is less than 0.1 μm, the filler is unable to act as a reinforcing agent that enables the composite to have desired mechanical characteristics. On the other hand, when the average particle diameter of the filler exceeds 5 μm, the filler may deteriorate transparency.

The composite according to the present invention that stably forms the matrix-filler morphology has a yield tensile strength of 400 kg/cm² or more at 20° C., which is less than the glass transition temperature of polyalkylene carbonate, an Izod impact strength of 7 kg·cm/cm or more, and a tensile elongation at break point of 200% or more, particularly 300% or more and thus has excellent mechanical characteristics and high transparency.

Meanwhile, as described above, although a polyalkylene carbonate and polyolefin combination is very attractive because it complements their disadvantages, miscibility therebetween is very low due to their different intrinsic properties. Thus, a composite of polyalkylene carbonate and polyolefin has an separated interface between the two resins, has a varying structure according to temperature, and is unable to form a stable morphology and thus desired mechanical characteristics may not be exhibited.

Therefore, in the present invention, to use polyalkylene carbonate in combination with polyolefin that may maintain advantages of the polyalkylene carbonate and complement disadvantages thereof, an initiator and a blending aid as particular components capable of enhancing miscibility between the two resins are used in combination and thus the above-described problems may be addressed.

The blending aid may be any one selected from a first blending aid having a lower molecular weight of 20 to 1,000 and a mixture of the first blending aid and a second blending aid having a higher molecular weight of 30,000 to 300,000.

In particular, the miscibility problems may be addressed using a combination including a first blending aid that binds to some molecular chains of the polyolefin and the polyalkylene carbonate through reaction to modify miscibility between the two resins and an initiator that induces such reaction; or the combination further including a second blending aid having, within a single molecular unit, a polar segment having compatibility with the polyalkylene carbonate and a non-polar segment having compatibility with the polyolefin.

In addition, when the mixed composition includes at least the combination of the first blending aid and the initiator, desired miscibility may be obtained and thus a stable morphology may be formed. However, when the mixed composition includes only the second blending aid, it may be hard to obtain desired miscibility and thus it is difficult to stably form the morphology. This may be confirmed from the results of Experimental Example 1, which will be described below.

Moreover, the initiator for induction of reaction of the first blending aid has to be used. When the initiator is omitted from the mixed composition, the reaction of the first blending aid does not independently occur and is induced through binding of the first blending aid to a base material and thus only similar miscibility to that in a case in which the second blending aid is used alone is exhibited and thus desired effects may not be obtained.

The initiator may, for example, be one or a mixture of at least two selected from the group consisting of a hydroperoxide-based initiator, a ketone peroxide-based initiator, an acyl peroxide-based initiator, a dialkyl or dialkyl peroxide-based initiator, a peroxy ester-based initiator, and an azo compound-based initiator. In particular, the initiator may be one or a mixture of at least two selected from the group consisting of tert-butyl hydroperoxide, p-methane hydroperoxide, cumene hydroxide, cyclohexanone peroxide, methylethyl ketone peroxide, benzoyl peroxide, di-tert-butyl peroxide, dicumyl peroxide, cumylbutyl peroxide, 1,1-di-tert-butylperoxy-3,5,5-trimethylcyclohexane, 2,5-dimethyl-2,5-2,5-di-tert-butylperoxy isopropylbenzene, tert-butyl peroxypivalate, tert-butyl di(perphthalate)dialkyl peroxymonocarbonate, and peroxydicarbonate azobis isobutyronitrile.

The first blending aid may be one or a mixture of at least two selected from the group consisting of vinyltrimethoxy silane, vinyl-tris(beta-methoxyethoxy)silane, vinyltriacetoxy silane, vinyltrismethoxyethoxy silane, gamma-(meth) acryloxypropyltriethoxy silane, vinyltriethoxy silane, and gamma-(meth)acryloxypropyltrimethoxy silane; and acrylic, fumaric acid, methacrylic acid, crotonic acid, maleic acid, itaconic acid, sorbic acid, and anhydrides thereof.

The second blending aid may be one or a mixture of at least two selected from ethylene acrylate copolymers such as ethylene-acrylic acid (EAA) copolymer, ethylene-methacrylic acid (EMA) copolymer, ethylene-ethylacrylate (EEA) copolymer, ethylene-alkylacrylate-acrylic acid copolymer, ethylene-alkylmethacrylate-methacrylic acid copolymer, ethylene-butylacrylate (EBA) copolymer, and ethylene-vinylacetate (EVA) copolymer, or a modified material thereof. More particularly, the second blending aid may be a modified maleic anhydride of EEA copolymer.

The initiator is used in a catalytic amount and thus the amount of the initiator may be 2 parts by weight or less, particularly 1 part by weight or less, based on 100 parts by weight of the polyolefin.

The first and second blending aids are added in effective amounts thereof. In particular, the amount of the first blending aid in the mixed composition may be 0.5 to 40 parts by weight, particularly 1 to 20 parts by weight, more particularly 1 to 10 parts by weight, based on 100 parts by weight of the polyolefin. When the first and second blending aids are used in combination, the amount of the second blending aid in the mixed composition may be 1 to 900 parts by weight, particularly 2 to 500 parts by weight, more particularly 2 to 100 parts by weight, based on 100 parts by weight of the polyolefin. That is, when the second blending aid is added together with the first blending aid, the second blending aid may be added in the amount within the above-described range, while the second blending aid may be added in an excessive amount with respect to the polyolefin. Thus, as the amount of the second blending aid increases, the amount of the polyolefin relatively decreases and thus configuration in which the polyolefin is added in a very small amount also should be interpreted as within the scope of the present invention.

In one specific embodiment, the mixed composition may further include a polymer having miscibility with the polyalkylene carbonate. When the polymer having miscibility with the polyalkylene carbonate is added, miscibility between the two resins is enhanced.

The polymer having miscibility with the polyalkylene carbonate may, for example, be one or a mixture of at least two selected from the group consisting of cellulose acetate propionate (CAP), cellulose acetate butyrate (CAB), polyamide (PA), polylactic acid (PLA), polybutylene succinate (PBS), polyvinyl acetate (PVAc), polymethyl methacrylate (PMMA), ethylene vinyl alcohol (EVOH), polyvinyl alcohol (PVA), polycarbonate (PC), and ionomer-based polymers.

In one specific embodiment, the amount of the polymer may be 1 to 30 wt %, particularly 5 to 20 wt %, based on a total weight of the mixed composition.

In addition, as desired, the mixed composition may further include an additive such as a plasticizer, an anti-foaming agent, an anti-oxidant, a flame retardant, a foaming agent, or the like.

The composite is used for articles (Film, Sheet, Bottle, Container etc.) which are manufactured by, for example, injection molding, extrusion, or the like, but the manufacturing method thereof is not limited to the above examples.

The articles may be used in electric and electronic components, building components, automobile components, machine components, daily necessities, industrial materials, and the like. In addition, the composite may be used in a variety of applications and this should be interpreted as within the scope of the present invention.

BRIEF DESCRIPTION OF THE DRAWINGS

The above and other objects, features and other advantages of the present invention will be more clearly understood from the following detailed description taken in conjunction with the accompanying drawing, in which.

BEST MODE

Now, the present invention will be described in more detail with reference to the following examples. These examples are provided for illustrative purposes only and should not be construed as limiting the scope and spirit of the present invention.

EXAMPLE 1

100 parts by weight of polyethylene (PE), 0.1 parts by weight of dicumyl peroxide as an initiator, and 1 part by weight of maleic anhydride having a molecular weight of 98 as a first blending aid were mixed using a super mixer, and 80 wt % of polypropylene carbonate was added to 20 wt % of the resultant mixture and melt-blended in a twin-screw extruder. The composite was subjected to injection molding to manufacture a molded product.

EXAMPLE 2

A molded product was manufactured in the same manner as in Example 1, except that maleic anhydride as a first blending aid was used in combination with 10 parts by weight of a modified maleic anhydride of ethylene-ethylacrylate copolymer having a molecular weight of about 120,000 as a second blending aid.

EXAMPLE 3

100 parts by weight of PE, 0.1 parts by weight of dicumyl peroxide as an initiator, 1.5 parts by weight of maleic anhydride as a first blending aid, and 10 parts by weight of a zinc ionomer, which is a miscible polymer, were mixed using a super mixer, and 80 wt % of polypropylene carbonate was added to 20 wt % of the resultant mixture and melt-blended in a twin-screw extruder. The composite was subjected to injection molding to manufacture a molded product.

EXAMPLE 4

100 parts by weight of PE modified with maleic anhydride, 0.1 parts by weight of dicumyl peroxide as an initiator, and 1 part by weight of trimethoxy silane as a first blending aid were mixed using a super mixer, and 80 wt % of polypropylene carbonate was added to 20 wt % of the resultant mixture and melt-blended in a twin-screw extruder. The composite was subjected to injection molding to manufacture a molded product.

COMPARATIVE EXAMPLE 1

A molded product was manufactured in the same manner as in Example 1, except that only 80 wt % of polypropylene carbonate was added to 20 wt % of PE and blended.

COMPARATIVE EXAMPLE 2

A molded product was manufactured in the same manner as in Example 1, except that the maleic anhydride as a first blending aid was not used and 10 parts by weight of ethylene-ethylacrylate copolymer modified with maleic anhydride as a second blending aid was used.

EXPERIMENTAL EXAMPLE 1

Figure 1:
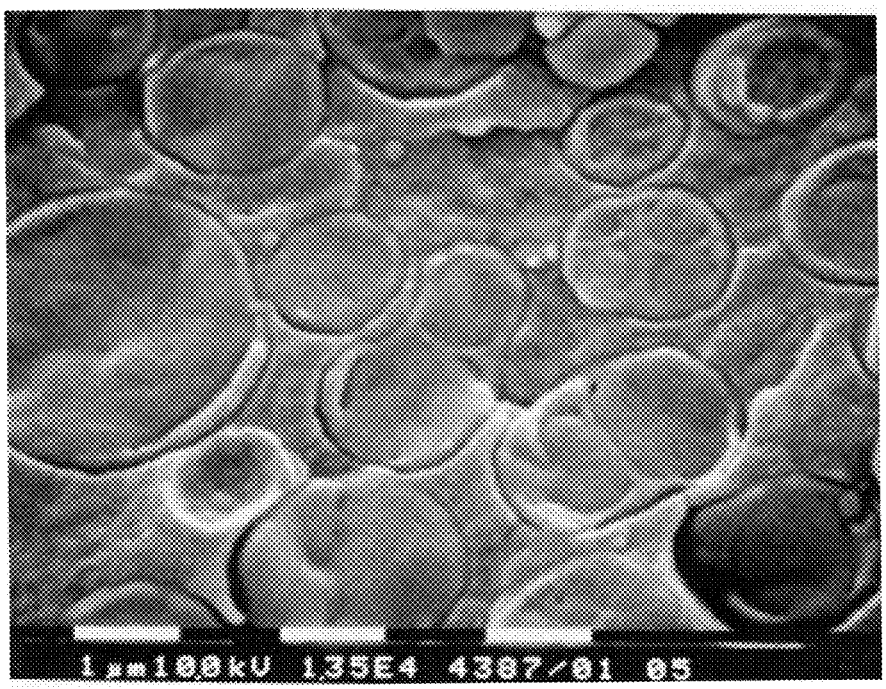
FIG. 1 is a scanning electron microscope (SEM) image of a composite obtained according to Example 1 through reaction of a mixture of polyalkylene carbonate and polyolefin.
Figure 2:
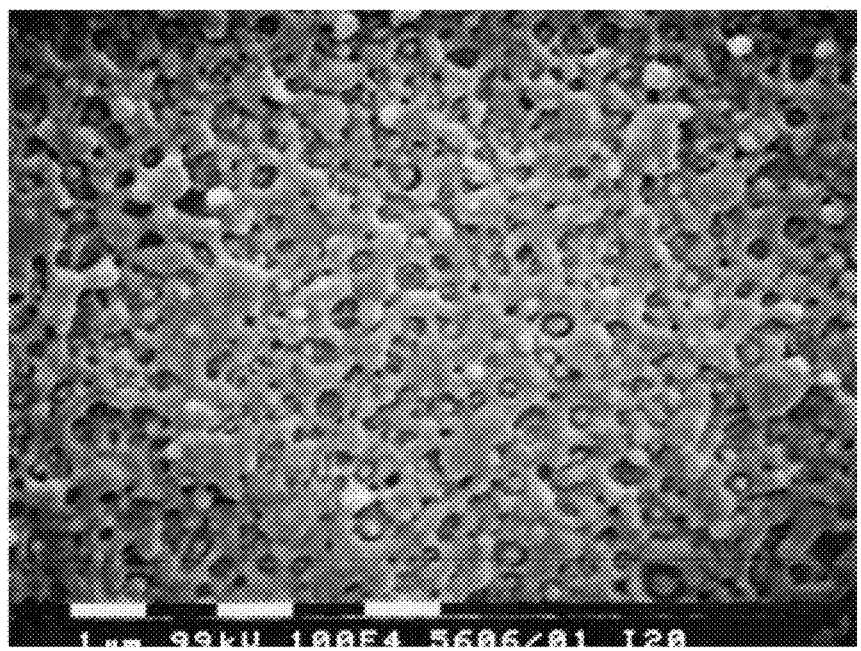
FIG. 2 is an SEM image of a composite obtained according to Example 2 through reaction of a mixture of polyalkylene carbonate and polyolefin.
Figure 3:
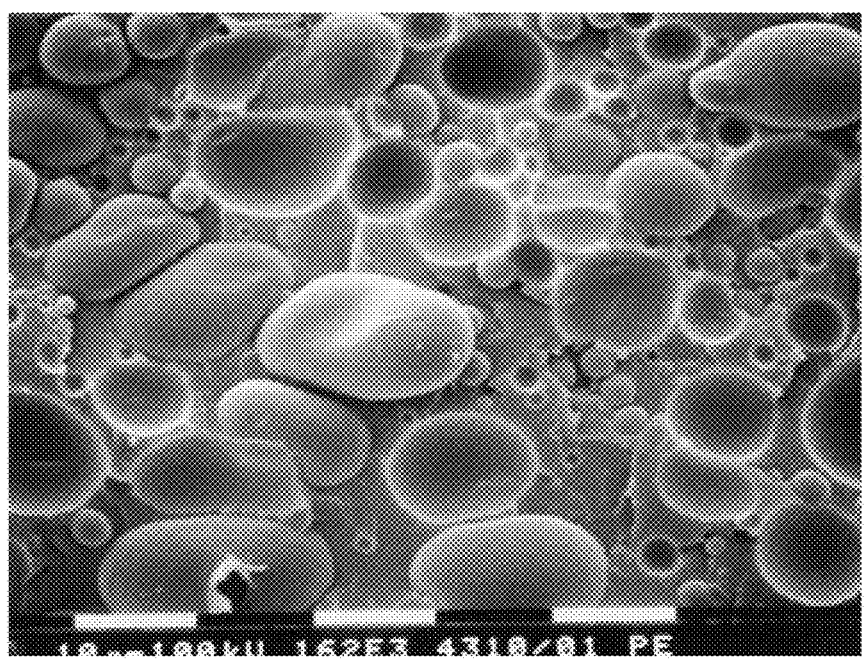
FIG. 3 is an SEM image of a composite obtained according to Comparative Example 1 through reaction of a mixture of polyalkylene carbonate and polyolefin.
Figure 4:
FIG. 4 is an SEM image of a composite obtained according to Comparative Example 2 through reaction of a mixture of polyalkylene carbonate and polyolefin.

Each of the mixtures prepared in Examples 1 and 2 and Comparative Examples 1 and 2 was subjected to reaction to prepare a polymer resin, and morphology of each composite was observed using a scanning electron microscope (SEM). Images taken using the SEM are illustrated in FIGS. 1 to 4. Referring to FIGS. 1 to 4, it can be confirmed that the composite of Examples 1 and 2 have a structure in which polyolefin is dispersed in polyalkylene carbonate in the form of particles with uniform size and there is no phenomenon in which the polyolefin escapes therefrom due to excellent miscibility with the polyalkylene carbonate, while the polymer resins of Comparative Examples 1 and 2 have a structure in which polyolefin escapes from polyalkylene carbonate as a matrix due to non-mixing of the polyolefin and the polyalkylene carbonate and the size of polyolefin domain is also not uniform.

In particular, in the composite of Comparative Example 2, although the second blending aid is included, the size of the polyolefin domain is not uniform and the polyolefin escapes from the polyalkylene carbonate due to poor miscibility therewith. This is because the polymer resin including the second blending aid alone has an unstable mixed phase and thus a particular morphology with excellent mechanical strength is not formed.

EXPERIMENTAL EXAMPLE 2

Each of the molded products of Examples 1 to 4 and Comparative Examples 1 and 2 was cut to a size of 10 cm×10 cm to construct a sample, and tensile elongation at break point, yield tensile strength, Izod impact strength, and stickiness of each sample were measured. Results are shown in Table 1 below.

TABLE 1

| | Tensile elongation at break point (%) | Yield tensile strength (kg/cm$^2$) | Izod impact strength (kg · cm/cm) | Stickiness 50° C. | Stickiness 90° C. |
|---|---|---|---|---|---|
| Comparative Example 1 | 140 | 290 | 2.1 | stickiness | stickiness |
| Comparative Example 2 | 160 | 340 | 2.5 | stickiness | stickiness |
| Example 1 | 310 | 420 | 7.1 | Non-stickiness | Non-stickiness |
| Example 2 | 320 | 410 | 8.5 | Non-stick- | Non-stick- |

TABLE 1-continued

| | Tensile elongation at break point (%) | Yield tensile strength (kg/cm²) | Izod impact strength (kg·cm/cm) | Stickiness 50° C. | Stickiness 90° C. |
|---|---|---|---|---|---|
| Example 3 | 370 | 430 | 15.0 | Non-stickiness | Non-stickiness |
| Example 4 | 340 | 410 | 12.0 | Non-stickiness | Non-stickiness |

* Stickiness is obtained by measuring stickiness between pellets after performing aging in an oven at 50° C. and 90° C. for 1 hour.

As shown in Table 1 above, it can be confirmed that the composite of Examples 1 to 4 exhibit excellent tensile elongation at break point, yield tensile strength and Izod impact strength and significantly enhanced adhesion between pellets as compared to the composite of Comparative Examples 1 and 2.

In addition, it can be confirmed that, when a second blending aid is used alone as in Comparative Example 2, desired mechanical/physical properties may not be obtained. This is because formation of the matrix-filler morphology is unstable when using a second blending aid alone and thus the polyolefin does not properly function as a reinforcing agent.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in a composite according to the present invention, a composite further includes particular components in addition to polyalkylene carbonate and polyolefin exhibits high miscibility. In addition, the composite includes particular amounts of the polyalkylene carbonate, the polyolefin, and other particular components and thus has a specific morphology, whereby excellent physical properties of the two resins are exhibited and mechanical characteristics, in particular tensile strength and impact strength, are enhanced and stickiness is enhanced.

The invention claimed is:

1. A composite prepared through reaction of a mixed composition comprising polyalkylene carbonate, polyolefin, initiator, and blending aid which is mixed with the polyolefin,
wherein an amount of the polyalkylene carbonate is 60 wt % to 95 wt %, and a total amount of the initiator, the blending aid, and the polyolefin is 5 wt % to 40 wt %,
wherein the composite has a matrix-filler morphology in which a matrix formed of the polyalkylene carbonate includes a filler formed of the polyolefin,
wherein the filler is uniformly dispersed in the matrix,
wherein the blending aid is selected from a first blending aid having a molecular weight of 20 to 1,000, or a mixture of the first blending aid and a second blending aid having molecular weight of 30,000 to 300,000, and
wherein the filler is present in the form of particles in the matrix.

2. The composite according to claim 1, wherein the filler has a particle diameter of 0.1 μm to 5 μm.

3. The composite according to claim 1, wherein the article has an Izod impact strength of 7 kg·cm/cm or more.

4. The composite according to claim 1, wherein the composite exhibit non-stickiness at a temperature of 50° C. to 90° C., in terms of stickiness in a pellet state.

5. The composite according to claim 1, wherein the article has a tensile elongation at break point of 300% or more.

6. The composite according to claim 1, wherein the article has a yield tensile strength of 400 kg/cm² or more.

7. The composite according to claim 1, wherein the polyalkylene carbonate is polyethylene carbonate (PEC) and/or polypropylene carbonate (PPC).

8. The composite according to claim 1, wherein the first blending aid is one or a mixture of at least two selected from the group consisting of vinyltrimethoxy silane, vinyl-tris (beta-methoxyethoxy)silane, vinyltriacetoxy silane, vinyltrismethoxyethoxy silane, gamma-(meth)acryloxypropyltriethoxy silane, vinyltriethoxy silane, and gamma-(meth) acryloxypropyltrimethoxy silane; and acrylic acid, fumaric acid, methacrylic acid, crotonic acid, maleic acid, itaconic acid, sorbic acid, and anhydrides thereof.

9. The composite according to claim 1, wherein the second blending aid is ethylene-ethylacrylate copolymer modified with maleic anhydride.

10. The composite according to claim 1, wherein the mixed composition further comprises a polymer having miscibility with the polyalkylene carbonate to enhance miscibility among the components.

11. The composite according to claim 10, wherein an amount of the miscible polymer is 1 wt % to 30 wt % based on a total weight of the mixed composition.

12. The composite according to claim 10, wherein the polymer is one or a mixture of at least two selected from the group consisting of cellulose acetate propionate (CAP), cellulose acetate butyrate (CAB), polyamide (PA), polylactic acid (PLA), polybutylene succinate (PBS), polyvinyl acetate (PVAc), polymethyl methacrylate (PMMA), ethylene vinyl alcohol (EVOH), polyvinyl alcohol (PVA), polycarbonate (PC), and ionomer-based polymers.

13. A molded product comprising the composite according to claim 1.

14. A molded product comprising the composite according to claim 12.

* * * * *